United States Patent
Kim et al.

(10) Patent No.: US 8,604,686 B2
(45) Date of Patent: *Dec. 10, 2013

(54) LIGHT SOURCE MODULE AND DISPLAY APPARATUS HAVING THE SAME

(71) Applicant: Samsung Display Co., Ltd., Gyeonggi-Do (KR)

(72) Inventors: Hyun Jin Kim, Yongin-si (KR); Seok Hyun Nam, Seoul (KR); Dong Chin Lee, Cheonan-si (KR); Hyuk Hwan Kim, Asan-si (KR); Min Jeong Wang, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,587

(22) Filed: Oct. 2, 2012

(65) Prior Publication Data
US 2013/0026948 A1    Jan. 31, 2013

Related U.S. Application Data

(63) Continuation of application No. 12/416,721, filed on Apr. 1, 2009, now Pat. No. 8,304,978.

(30) Foreign Application Priority Data

Nov. 9, 2008 (KR) .................. 10-2008-0089836

(51) Int. Cl.
*H01L 33/00* (2010.01)
*G09G 3/36* (2006.01)

(52) U.S. Cl.
USPC ............. 313/498; 313/483; 313/485; 445/24; 445/25

(58) Field of Classification Search
CPC .................................. H01L 33/00; G09G 3/36
USPC ................ 313/498–512; 445/24–25; 252/501
See application file for complete search history.

(56) References Cited

U.S. PATENT DOCUMENTS 2,601,032 A    6/1952    Larach
8,304,978 B2 *  11/2012    Kim et al. ..................... 313/500
(Continued)

FOREIGN PATENT DOCUMENTS

JP    10-190067    7/1998
JP    2001-222904   8/2001
(Continued)

OTHER PUBLICATIONS

English Abstract for Publication No. 2007-042307.

(Continued)

*Primary Examiner* — Tracie Y Green
(74) *Attorney, Agent, or Firm* — F. Chau & Associates, LLC

(57) ABSTRACT

A light source module includes first and second light sources. The first light source includes a blue light-emitting body emitting blue light and a red fluorescent material disposed around the blue light-emitting body emitting red light by virtue of being excited by the blue light. The second light source is disposed adjacent to the first light source, and includes a green light-emitting body emitting green light. The blue and green light-emitting materials may include a light-emitting diode (LED) chip including substantially the same material. Accordingly, since a variation of light efficiency of the light source module with respect to temperature is small, a color feedback system may be omitted, and color reproducibility may be high.

18 Claims, 7 Drawing Sheets

(56) References Cited

U.S. PATENT DOCUMENTS

| | | |
|---|---|---|
| 2004/0217364 A1 | 11/2004 | Tarsa et al. |
| 2006/0291246 A1 | 12/2006 | Hattori et al. |
| 2007/0007890 A1 | 1/2007 | Kim et al. |
| 2007/0024195 A1 | 2/2007 | Kim |
| 2007/0284994 A1 | 12/2007 | Morimoto et al. |

FOREIGN PATENT DOCUMENTS

| | | |
|---|---|---|
| JP | 2007-042307 | 2/2007 |
| JP | 2007-201473 | 8/2007 |
| JP | 2007-227680 | 9/2007 |
| JP | 2007-242246 | 9/2007 |
| JP | 2008-205133 | 9/2008 |
| KR | 1020080052515 | 6/2008 |

OTHER PUBLICATIONS

English Abstract for Publication No. 2007-227680.
English Abstract for Publication No. 1020080052515.
English Abstract for Publication No. 2001-222904.
English Abstract for Publication No. 2008-205133.
English Abstract for Publication No. 2007-242246.
English Abstract for Publication No. 10-190067.
English Abtract for Publication No. 2007-201473.

* cited by examiner

LIGHT SOURCE MODULE AND DISPLAY APPARATUS HAVING THE SAME

CROSS-REFERENCE TO RELATED APPLICATIONS

This application is a continuation of co-pending U.S. patent application Ser. No. 12/416,721, filed Apr. 1, 2009, which claims priority under 35 U.S.C. §119 to Korean Patent Application No. 10-2008-0089836, filed on Sep. 11, 2008 in the Korean Intellectual Property Office (KIPO), the contents of which are herein incorporated by reference in their entirety.

BACKGROUND OF THE INVENTION

1. Technical Field

The present invention relates to a light source module and more particularly, the present invention relates to a light source module and a display apparatus having the light source module.

2. Discussion of the Related Art

Generally, a liquid crystal display (LCD) apparatus includes a backlight assembly providing light to a display panel to display an image. A cold cathode fluorescent lamp (CCFL) is often used as a light source of the backlight assembly. More recently, light-emitting diodes (LEDs) have been used as a light source because the LED has low power consumption, small volume and light weight.

One challenge in using LEDs as a backlight light source is to produce a white light, as LEDs tend to be monochromatic. One approach to creating white light from LEDs is to coat a blue LED chip with a yellow fluorescent material. However, the above-mentioned blue LED chip merely uses blue and yellow light to emit the white light without using full colors having red, green and blue light, and thus color reproducibility of the display panel is decreased.

Research has been conducted to enhance color reproducibility in LED backlights, but a light source having good color reproducibility and good light efficiency has not been easy to develop. For example, emitting white light by mixing red, green and blue LEDs is the most reliable method for producing good color reproducibility and good light efficiency. However, the degree of light output from LEDs may be highly dependent on temperature, with each color LED having a different temperature response. Accordingly, in order to create an even white light, driving conditions for the LEDs may be changed to account for a relatively low temperature at activation. "Color coordinates" relates to an approach for representing the appearance of a color in terms of a set of numeric values for each of the constituent primary colors. Color coordinates may represent a color as a set of three numbers, for example, a red value between 0 and 255, a green value between 0 and 255, and a blue value between 0 and 255. Alternatively, color coordinates may be expressed as a set of percentages, degrees or other values. Thus, color coordinates indicates a value for the color being displayed. One example of a popularly used color coordinate system is the Adobe color coordinate system. Because temperature can affect a red, blue and green LED differently, changes in temperature may result in undesirable changes in color coordinates.

Thus, to prevent the changing of the color coordinates, a feedback system using a color sensor has been developed, but to increase the sensitivity of the color sensor, to realize an optical system having optimal color sensing ability, and to increase the quality of color compensation, sophisticated logic is used. In addition, the number of LEDs used and costs due to the feedback system may be relatively high.

SUMMARY OF THE INVENTION

Exemplary embodiments of the present invention provide a light source module having stable light efficiency and high color reproducibility using a small number of light-emitting diodes (LEDs).

Exemplary embodiments of the present invention also provide a display apparatus having high color reproducibility.

In an example light source module according to the present invention, the light source module includes first and second light sources. The first light source includes a blue light-emitting body emitting blue light and a red fluorescent material disposed around the blue light-emitting body. The red fluorescent material emits red light by virtue of being excited by the blue light. The second light source is disposed adjacent to the first light source, and includes a green light-emitting body emitting green light.

The red fluorescent material may include at least one fluorescent material selected from a silicate-based fluorescent material consisting of a $Zn_2SiO_4:Mn^{2+}$ fluorescent material, an $Mg_2SiO_4:Mn^{2+}$ fluorescent material, a $Ba_2SiO_4:Mn^{2+}$ fluorescent material, a $Sr_2SiO_4:Mn^{2+}$ fluorescent material and a $Ca_2SiO_4:Mn^{2+}$ fluorescent material. The blue light-emitting body and the green light-emitting body may include an LED chip including a GaN-based material.

The light source module may further include a driving part applying a driving current to the blue light-emitting body and the green light-emitting body individually to control the color coordinates of the module-emitted light. The driving part may apply a predetermined driving current to the blue light-emitting body and the green light-emitting body individually to reach target color coordinates of the module-emitted light, without using a feedback device sensing the light emitted from the first and second light sources and feeding the light back to control the color coordinates.

The light source module may further include a power-transmitting substrate electrically connected to the driving part. A plurality of basic clusters may be formed on the power-transmitting substrate, and each of the basic clusters may include the first and second light sources. The distance between adjacent basic clusters may be different from the distance between the first and second light sources. The first light source may further include a first cover portion enclosing the blue light-emitting body. The second light source may further include a second cover portion enclosing the green light-emitting body. The red fluorescent material may be dispersed in the first cover portion.

In an example display apparatus according to the present invention, the display apparatus includes a display panel displaying an image, a light guide unit disposed on a rear surface of the display panel, and a light source module disposed on at least one surface of the light guide unit. The light source module includes first and second light sources. The first light source includes a blue light-emitting body emitting blue light and a red fluorescent material disposed around the blue light-emitting body. The red fluorescent material emits red light by virtue of being excited by the blue light. The second light source is disposed adjacent to the first light source, and includes a green light-emitting body emitting green light.

The blue light-emitting body and the green light-emitting body may each include an LED chip including substantially the same material, so that an amount of light emitted from the blue light-emitting body and an amount of the light emitted from the green light-emitting body maintain the desired mixture of light color even when exposed to variation in temperature. The red fluorescent material may include at least one fluorescent material selected from a silicate-based fluorescent material consisting of a Zn2SiO4:Mn2+ fluorescent material, an Mg2SiO4:Mn2+ fluorescent material, a Ba2SiO4:Mn2+ fluorescent material, a Sr2SiO4:Mn2+ fluorescent material and a Ca2SiO4:Mn2+ fluorescent material.

The display apparatus may further include a light source driving part applying a driving current to the blue light-emitting body and the green light-emitting body individually to control the color coordinates of the module-emitted light. The display apparatus may further include a panel driving part transmitting a panel driving signal displaying the image to the display panel, and transmitting a light source driving signal to the light source driving part. The light source driving signal may be linked with the panel driving signal and may individually provide a driving current to the blue light-emitting body and the green light-emitting body. The panel driving part may apply a predetermined driving current to the blue light-emitting body and the green light-emitting body individually to reach target color coordinates of the module-emitted light, for example, without using a feedback device sensing the light emitted from the first and second light sources and feeding the light back to control the color coordinates. The color reproducibility of the module-emitted light may reach more than 95% with respect to Adobe color coordinates due to the light source module.

The light source module may further include a power-transmitting substrate electrically connected to the light source driving part. A plurality of basic clusters may be formed on the power-transmitting substrate, and each of the basic clusters may include the first and second light sources.

According to exemplary embodiments of the present invention, each of the variations of amounts of red, green and blue light is very small even though the variation of a temperature is very large, so that stable light efficiency may be obtained. Thus, expensive technology such as a color feedback system may be unnecessary and color reproducibility may be enhanced.

BRIEF DESCRIPTION OF THE DRAWINGS

The above and other features and aspects of the exemplary embodiments of the present invention will be described in detail with reference to the accompanying drawings.

DETAILED DESCRIPTION OF THE EXEMPLARY EMBODIMENTS

Figure 1:
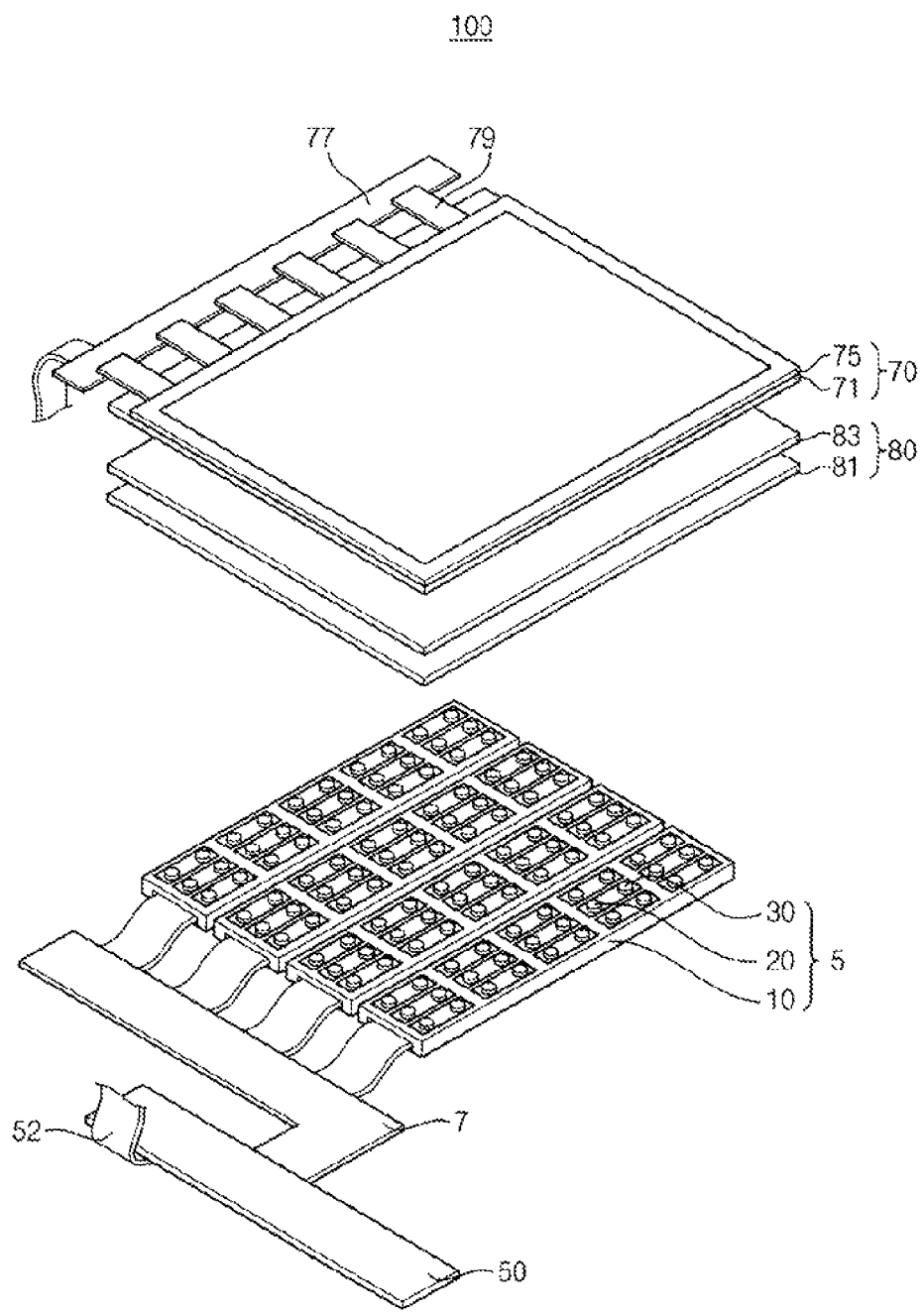
FIG. 1 is an exploded perspective view illustrating a display apparatus according to an exemplary embodiment of the present invention.

Exemplary embodiments of the present invention are described more fully hereinafter with reference to the accompanying drawings. The present invention may, however, be embodied in many different forms and should not be construed as limited to the exemplary embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present.

Hereinafter, exemplary embodiments of the present invention will be explained in detail with reference to the accompanying drawings.

Figure 2:
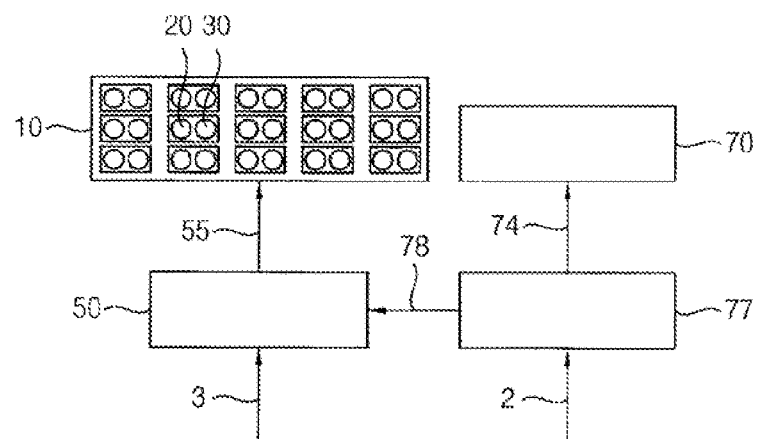
FIG. 2 is a block diagram illustrating the display apparatus of FIG. 1.

FIG. 1 is an exploded perspective view illustrating a display apparatus according to an exemplary embodiment of the present invention. FIG. 2 is a block diagram illustrating the display apparatus of FIG. 1.

Referring to FIGS. 1 and 2, the display apparatus 100 according to an exemplary embodiment includes a display panel 70, a light guide unit 80 and a light source module 5. The light guide unit 80 and the light source module 5 according to the present example embodiment are vertically disposed to form a direct-illumination type display apparatus.

The display panel 70 includes an array substrate 71 on which pixels are formed, a counter substrate 75 facing the array substrate 71, and a liquid crystal layer (not shown) disposed between the array substrate 71 and the counter substrate 75. The display panel 70 may be a liquid crystal display (LCD) panel driven by an active matrix type.

The display apparatus 100 may further include a panel driving part 77. The panel driving part 77 may be a printed circuit board (PCB) on which circuit elements are mounted to drive the pixels of the display panel 70. The panel driving part 77 is electrically connected to a side end portion of the display panel 70 through a panel flexible printed circuit (FPC) film 79. An image signal 2 (FIG. 2) from outside may be applied to the panel driving part 77. The panel driving part 77 transmits a panel driving signal 74 (FIG. 2) driving the pixel based on the image signal 2 to the pixel through the panel FPC film.

The light guide unit 80 is disposed on a rear surface of the display panel 70. The light guide unit 80 may include a diffusing plate 81 and an optical sheet 83. The diffusing plate 81 receives light emitted from the light source module 5 and emits the light having enhanced uniform brightness. The optical sheet 83 converts the light emitted from the diffusing plate 81 into the light having the enhanced uniform brightness and emits the light having the enhanced uniform brightness to the rear surface of the display panel 70.

The light source module 5 is disposed under the light guide unit 80 and is spaced apart from the light guide unit 80 by a predetermined distance. The light source module 5 emits mixed light mixed with red, green and blue light to the light guide unit 80. The mixed light may be white light.

The display apparatus 100 may further include a light source driving part 50. The light source driving part 50 may include a converter (not shown). A light source power 3 (FIG. 2) is provided to the light source driving part 50 from outside. The light source power 3 may be provided to the light source driving part 50 via the panel driving part 77. The panel driving part 77 and the light source driving part 50 are electrically connected with each other through a connecting cable 52. The panel driving part 77 may transmit a light source control signal 78 (FIG. 2) linked with the panel driving signal 74 to the light source driving part 50. The light source driving part 50 may be electrically connected to the light source module 5 through a power-transmitting element 7 such as a light source FPC film. The light source driving part 50 applies a light source driving signal 55 (FIG. 2) such as a driving current to the light source module 5 based on the light source power 3 and the light source control signal 78.

The light source module 5 according to an exemplary embodiment of the present invention has a small variation of light emitted from the light source module 5 with respect to a variation of temperature. Thus, a feedback system is unnecessary and may be omitted. For example, the feedback system may sense the characteristics of light emitted from the light source module 5, such as a variation of an amount of light according to the temperature and a variation of color coordinates according to the variation of the amount of the light, and transmit a feedback signal to the panel driving part 77.

Figure 3:
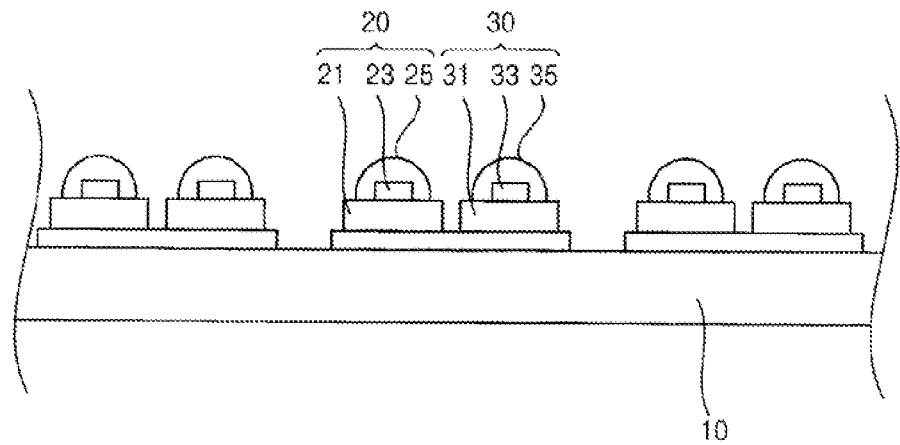
FIG. 3 is a cross-sectional view taken along a line I-I' of FIG. 1.

FIG. 3 is a cross-sectional view taken along a line I-I' of FIG. 1.

Referring to FIGS. 1 and 3, the light source module 5 includes first and second light sources 30 and 20. The first and second light source modules 30 and 20 may be point light sources such as light-emitting diode (LED) packages. The first light source 30 is disposed adjacent to the second light source 20, and the first and second light sources 30 and 20 may form one cluster.

The light source module 5 may further include a power-transmitting substrate 10 on which the first and second light sources 30 and 20 are mounted. The power-transmitting substrate 10 substantially has a rectangular shape. Circuit lines are formed on the power-transmitting substrate 10 to transmit the driving current to the first and second light sources 30 and 20.

The first and second light sources 30 and 20 may be directly mounted on the power-transmitting substrate 10. A plurality of first light sources 30 and a plurality of second light sources 20 are arranged on the power-transmitting substrate 10. A pair of the first and second light sources 30 and 20 adjacent to each other may form one unit cluster, and each of the first light sources 30 and each of the second light sources 20 are disposed in an alternating arrangement. The distance between the first and second light sources 30 and 20 is smaller than that between the clusters adjacent to each other. A plurality of the power-transmitting substrates 10 may be arranged under the light guide unit 80 in parallel.

The first light source 30 includes a blue light-emitting body 33 and a red fluorescent material. The red fluorescent material may be, for example, a red phosphor.

The blue light-emitting body 33 may be a blue LED chip 33. The blue LED chip 33 emits blue light when the driving current is applied to the blue LED chip 33.

The red fluorescent material may be disposed around the blue LED chip 33. The red fluorescent material may include at least one fluorescent material selected from a silicate-based fluorescent material consisting of a Zn2SiO4:Mn2+ fluorescent material, an Mg2SiO4:Mn2+ fluorescent material, a Ba2SiO4:Mn2+ fluorescent material, a Sr2SiO4:Mn2+ fluorescent material and a Ca2SiO4:Mn2+ fluorescent material.

The red fluorescent material is excited by partial blue light emitted from the blue LED chip 33. The excited red fluorescent material is stabilized to emit the red light. Thus, the first light source 30 emits the red light from the red fluorescent material and remaining blue light not used for exciting the red fluorescent material at the same time. Thus, the amount of the red light may be controlled by that of the blue light.

The first light source 30 may further include a first cover portion 35. The first cover portion 35 encapsulates the blue LED chip 33. The first cover portion 35 may include a transparent resin. The red fluorescent material is dispersed in the first cover portion 35.

The first light source 30 may further include the blue LED chip 33 and a first packaging mold 31 fixing the first cover portion 35. The blue LED chip 33 is fixed to an upper surface of the first packaging mold 31, and power source input and output lines may pass through the first packaging mold 31 to be electrically connected to the blue LED chip 33. The first cover portion 35 covers the upper surface of the first packaging mold 31 and encapsulates the blue LED chip 33.

The second light source 20 includes a green light-emitting body 23 and a second cover portion 25. The green light-emitting body 23 may be a green LED chip 23. The green LED chip emits the green light when the driving current is applied to the green LED chip 23. The second cover portion 25 encapsulates the green LED chip 23. The second light source may further include a second packaging mold 21.

Figure 4:
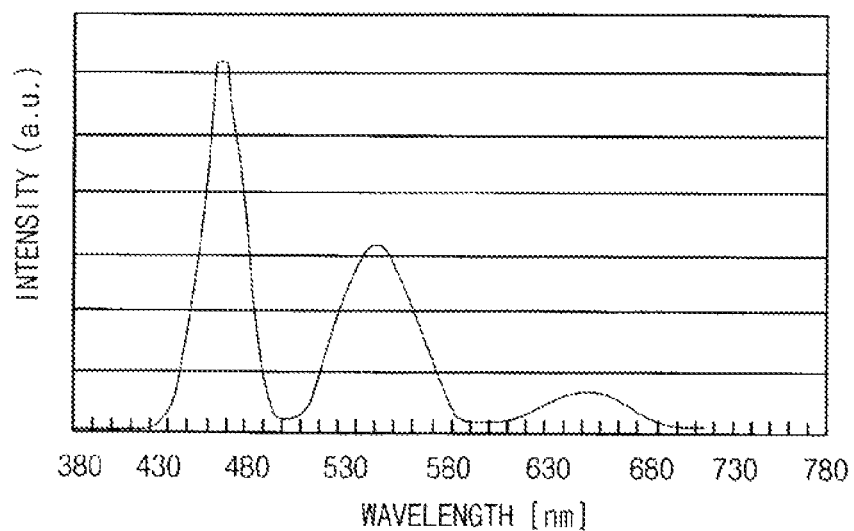
FIG. 4 is a graph showing an intensity of light emitted from a light source module of FIG. 3 with respect to wavelength.

FIG. 4 is a graph showing an intensity of light emitted from a light source module of FIG. 3 with respect to wavelength.

The horizontal axis indicates wavelength, and the vertical axis indicates an intensity of the light in FIG. 4. As illustrated in FIG. 4, the light source module 5 emits the blue light from the blue LED chip 33, the red light from the red fluorescent material excited by the blue light and the green light from the green LED chip 23. Module-emitted light is defined as the mixed light mixed with the blue, red and green light emitted from the light source module 5.

Referring to FIG. 4, light-emitting peaks of the red, green and blue light are between about 640 nm and about 650 nm, between about 525 nm and about 535 nm and between about 450 nm and about 455 nm, respectively. For example, the red, green and blue light may be mixed with a ratio of 3:6:1 based on the amount of the light, so that the module-emitted light may be the white light.

The light source control signal 78 may include a dimming signal. The color and brightness of the module-emitted light of a cluster block of the light source module 5 in an area which corresponds to the area of the display panel 70 may be controlled according to the color and the brightness of the image displayed by the display panel 70 based on the dimming signal. The cluster block is defined as a dimming control unit having at least one cluster.

The intensity of the red light is relatively small in FIG. 4, but the amount of the red light emitted from the red fluorescent material is sufficient for color reproducibility of the display apparatus 100. Generally, the green light is used in obtaining the white light and having high color reproducibility, but according to an exemplary embodiment of the present invention, the green light is obtained from the green LED chip 23, so that the green light may be sufficiently provided.

Figure 5:
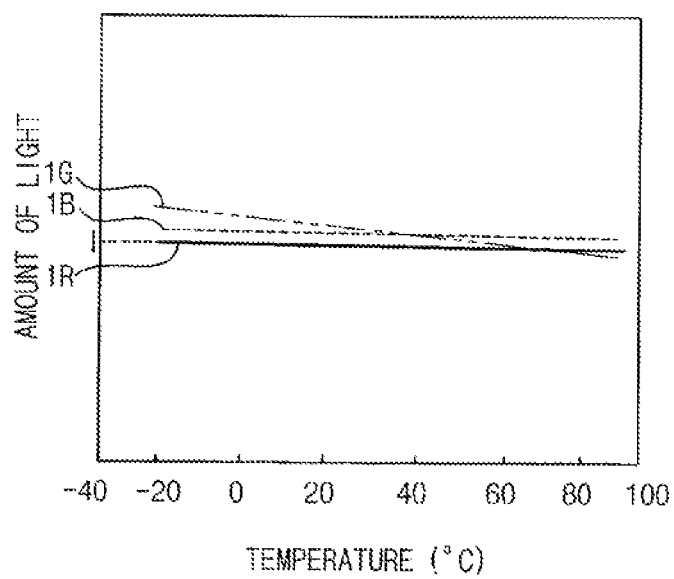
FIG. 5 is a graph showing a variation of an amount of light emitted from the light source module of FIGS. 3 and 4 with respect to temperature.

FIG. 5 is a graph showing a variation of an amount of light emitted from the light source module of FIGS. 3 and 4 with respect to temperature.

The horizontal axis indicates the temperature around the light source module 5, and the vertical axis indicates each of relative amounts of red, green and blue light 1R, 1G and 1B emitted from the light source module 5 with respect to a reference amount of light. The temperature around the light source module 5 is substantially the same as the temperature of the light source module 5. Each of the variations of the amounts of the red, green and blue light 1R, 1G and 1B are shown in FIG. 5, when the temperature is changed within a range between about −40° C. and about 100° C.

As shown in FIG. 5, even though the temperature around the light source module 5 is changed within the above-mentioned range, each of the amounts of the red, green and blue light is not rapidly changed. The reference amount of light is defined as an average value of the amounts of the red, green and blue light 1R, 1G and 1B when the temperature around the light source module 5 is about 20° C. The reference amount of light is shown as 'I' in FIG. 5.

Each of the variations of the amounts of the red, green and blue light 1R, 1G and 1B is within about ±10% with respect to a reference amount of light. In addition, the variations of the amounts of the red, green and blue light are substantially similar, so that deviations between the red, green and blue lights 1R, 1G and 1B are very small. Thus, a color feedback system to compensate for the variation of the color coordinates in the above-mentioned variation of the amount of light may be omitted.

According to exemplary embodiments of the present invention, the red fluorescent material is excited by the blue LED chip 33, so that the variation of the amount of the red light 1R has substantially the same tendency as the variation of the amount of the blue light 1B, and the green light 1G is obtained from the green LED chip 23. Accordingly, the variations of the characteristics of the red, green and blue light 1R, 1G and 1B with respect to the temperature may be very small.

Figure 6:
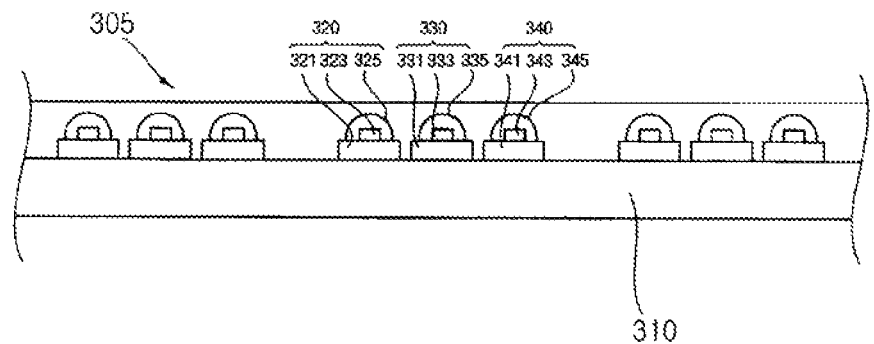
FIG. 6 is a cross-sectional view illustrating a three-color light-emitting diode (LED) light source module having red, green and blue LED chips.

FIG. 6 is a cross-sectional view illustrating a three-color LED light source module having red, green and blue LED chips.

The three-color LED light source module 305 as illustrated in FIG. 6 is presented to evaluate the stability of the light emitted from the light source module 5 with respect to the temperature of the light source module 5 according to an exemplary embodiment of the present invention. Accordingly, the stability of light efficiency may be measured. The three-color LED light source module 305 is substantially the same as the light source module discussed above with respect to FIGS. 1 through 5, except that the three-color LED light source module 305 includes red, green and blue point light sources 320, 330 and 340 instead of the first and second light sources 30 and 20, and further includes a color feedback system.

The red, green and blue point light sources 320, 330 and 340 include red, green and blue LED chips 323, 333 and 343, respectively. The red, green and blue LED chips 323, 333 and 343 are enclosed by transparent cover portions 325, 335 and 345, respectively, and are connected to the power-transmitting substrate 310 through packaging molds 321, 331 and 341, respectively. The red, green and blue LED chips 323, 333 and 343 form one cluster, and a plurality of clusters is disposed on the power-transmitting substrate 310. In the three-color LED light source module 305, the red light is not obtained from the red fluorescent material but from the red LED chip 323.

Figure 7:
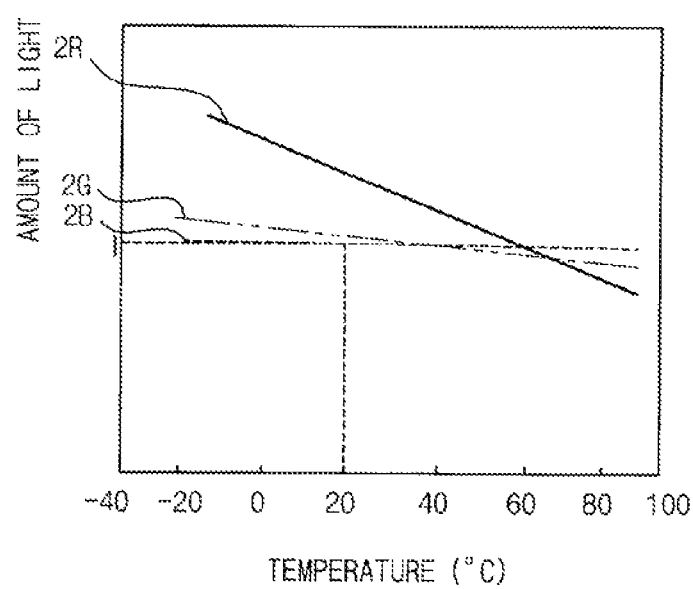
FIG. 7 is a graph showing a variation of an amount of light emitted from the three-color LED light source module of FIG. 6 with respect to temperature.

FIG. 7 is a graph showing a variation of an amount of light emitted from the three-color LED light source module of FIG. 6 with respect to the temperature.

Referring to FIG. 7, in the three-color LED light source module 305, each of the variations of the amounts of the red, green and blue lights 2R, 2G and 2B is very large within the above-mentioned temperature range. For example, the amount of the red light 2R is rapidly decreased when the temperature is over 60° C.

The red LED chip 323 includes a GaAs-based material, but the green and blue LED chips 333 and 343 include a GaN-based material, so that the variation of the amount of the red light 2R is rapidly decreased. For example, the LED including the GaN-based material has light-emitting characteristics more stable and less affected by the temperature than the LED including the GaAs-based material. Thus, each of the variations of the amounts of light from the green and blue LED chips 333 and 343 is less than the variation of the amount of the light from the red LED chip 323.

Accordingly, the color coordinates of the white light mixed with the red, green and blue light 2R, 2G and 2B may be rapidly changed with respect to the temperature. When the color coordinates are changed, the display quality of the display apparatus may be remarkably decreased, so that the color coordinates should be changed within a predetermined range regardless of the temperature around the light source module.

Figure 8:
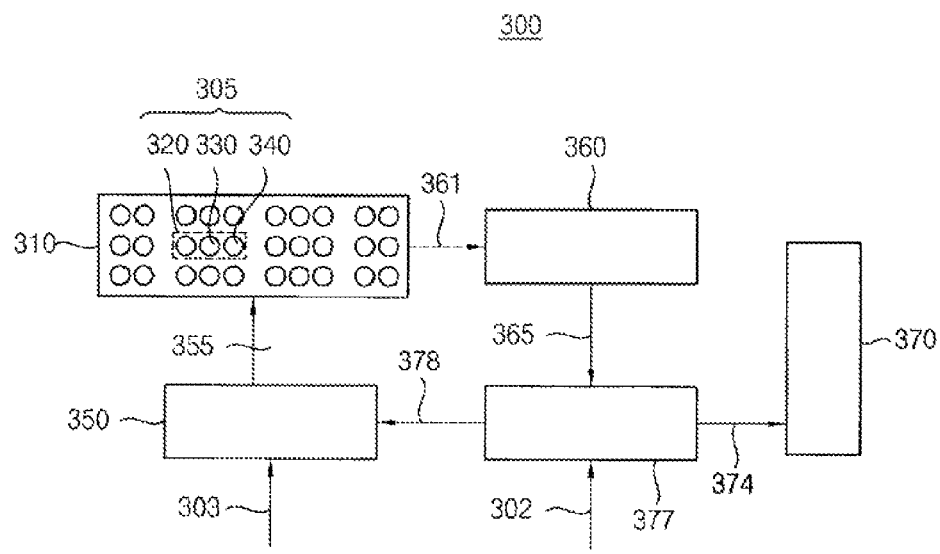
FIG. 8 is a block diagram illustrating the display apparatus having the three-color LED light source module of FIG. 6.
Figure 9:
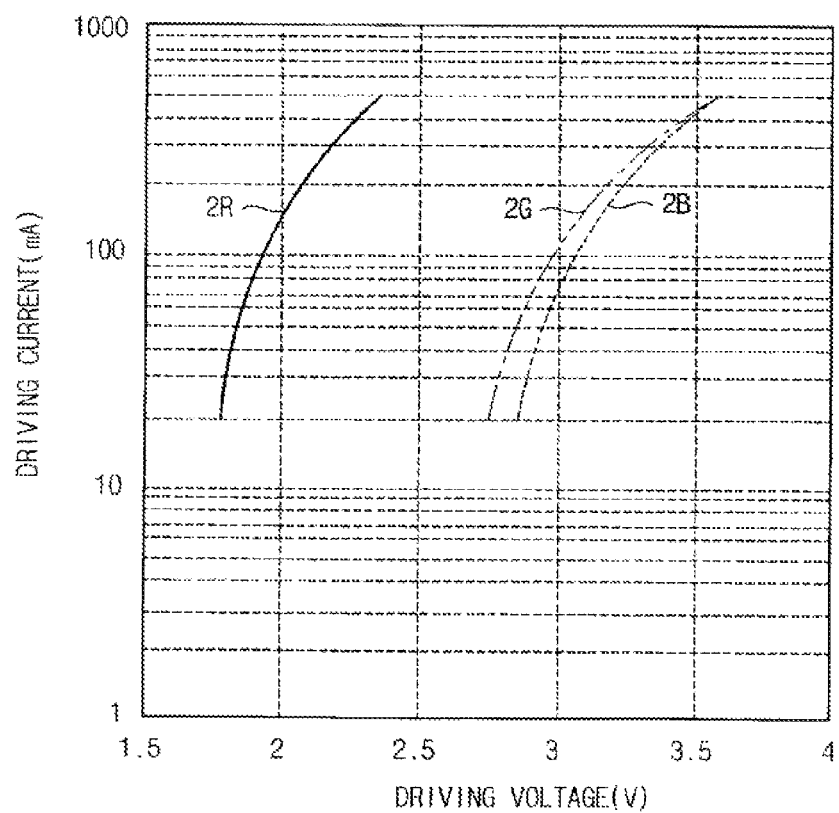
FIG. 9 is a graph showing a driving current with respect to a driving voltage of the three-color LED light source module of FIG. 6.

FIG. 8 is a block diagram illustrating the display apparatus having the three-color LED light source module of FIG. 6. FIG. 9 is a graph showing a driving current with respect to a driving voltage of the three-color LED light source module of FIG. 6.

Referring to FIGS. 8 and 9, the display apparatus 300 having the three-color LED light source module 305 different from the display apparatus 100 according to an exemplary embodiment of the present invention further includes a color feedback system 360. The color feedback system 360 senses the amount of the module-emitted light 361 emitted from the three-color LED light source module 305, and transmits a feedback signal 365 to a display panel driving part 377. For example, the color feedback system 360 senses the white light to measure the amounts of the red, green and blue light 2R, 2G and 2B.

The panel driving part 377 transmits a panel driving signal 374 to the display panel 370 based on an image signal 302 from outside. The panel driving part 377 transmits a light source control signal 378 to the light source driving part 350, and the light source control signal 378 includes a compensation signal that restores converted color coordinates based on the feedback signal 365 to predetermined color coordinates.

The light source driving part 350 applies a converted light source driving signal 355 such as a driving current to the three-color LED light source module 305 based on the light source power 303 and the light source control signal 378 from outside. Thus, each of the amounts of the red, green and blue light 2R, 2G and 2B emitted by the three-color LED light source module 305 is changed, so that the color coordinates of the module-emitted light 361 may be restored to the predetermined color coordinates.

The color feedback system 360 is expensive, and the reliability of the feedback is not high. In addition, as shown in FIG. 9, compared to the green and blue LED chips 333 and 343, the red LED chip 323 has a large deviation in voltage-current characteristics, so that an operation logic circuit at the panel driving part 377 and a circuit generating the driving current at the light source driving part 350 may be complicated.

However, the variation of the amount of the light with respect to the temperature is very small in the light source module 5 and the display apparatus 100 according to exemplary embodiments of the present invention. As mentioned above, according to exemplary embodiments of the present invention, the LED chip 323 having the large deviation at the voltage-current characteristics is removed and the red light 1R is obtained by dispersing the red fluorescent material in the first cover portion 35 having the resin material and encapsulating the blue LED chip 33 as illustrated in FIG. 3, so that the variation of the amount of the light emitted from the light source module 5 is very small.

According to exemplary embodiments of the present invention, the red light 1R is controlled by an output of a driving power source applied to the blue LED chip 33. Thus, the amount of the red light 1R is affected by the variation of the amount of the light emitted from the blue LED chip 33, so that the red, green and blue light 1R, 1G and 1B emitted from the light source module 5 is controlled by the LED chip including the GaN-based material. Thus, each of the variations of the amounts of the red, green and blue light 1R, 1G and 1B is very small.

Accordingly, the display apparatus 100 according to exemplary embodiments of the present invention, may display the image with stable color coordinates without the color feedback system 360 compensating for the variation of the color coordinates. In addition, the color feedback system 360 and the red LED 323 may be omitted, so that the number of the elements of the display apparatus 100 is decreased. Thus, the volume and the weight of the display apparatus 100 may be decreased.

Figure 10:
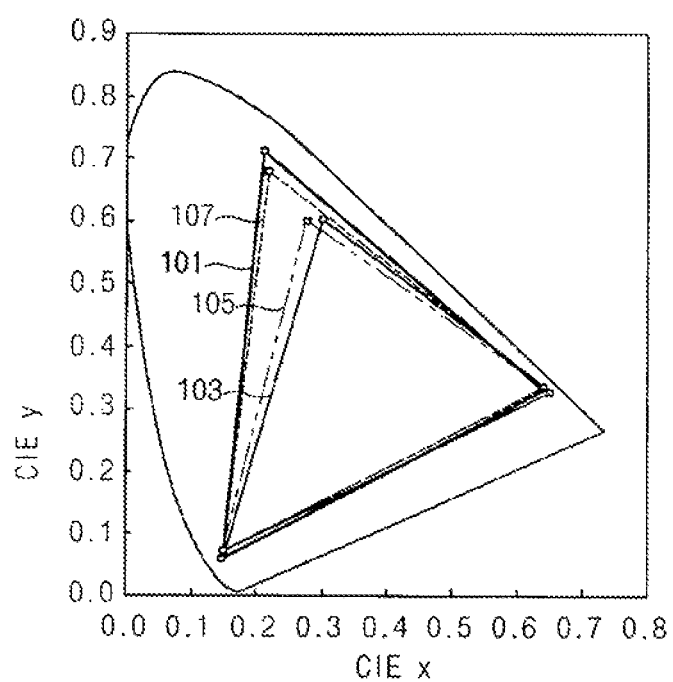
FIG. 10 is color coordinates showing the color reproducibility of an image displayed by the display apparatus of FIGS. 1 to 5.

FIG. 10 is color coordinates showing the color reproducibility of an image displayed by the display apparatus of FIGS. 1 to 5.

Referring to FIG. 10, in an aspect of the color reproducibility, the three-color LED light source module 305 meets Adobe RGB standards. Multimedia devices display all colors using an additive color mixture process of the red, green and blue colors. A color area displayed by the three-color additive color mixture process is defined as a color space, and illustrating the color space with two-dimensional coordinates is defined as the color coordinates. Multimedia devices with wider color spaces exhibit better color reproducibility. The Adobe RGB standard is a standard of the color space having strict color reproducibility in a green area, and the Adobe RGB standard is selected for most modern multimedia devices.

A first vertex nearest to the origin of the coordinates indicates the blue color, a second vertex at the right side of the first vertex indicates the red color, and a third vertex at the upper side of the first and second vertexes indicates the green color, in triangles illustrated in FIG. 10. In FIG. 10, the color reproducibility is better as the area of the triangle is larger, and the Adobe RGB conditions are shown as a first triangle 101 having the first largest area. The color reproducibility of the light source module 5 and the display apparatus 100 is shown as a second triangle 107 having the second largest area. Thus, more than 95% color reproducibility with respect to an ideal color coordinates, which may be, for example, the Adobe RGB color coordinates, may be obtained in the light source module 5 according to exemplary embodiments of the present invention.

In FIG. 10, a third triangle 103 having the smallest area indicates the light source module 5 emitting the white light by coating a yellow fluorescent material such as a YAG fluorescent material on the blue LED chip 33. A fourth triangle 105 having the second smallest area indicates the light source module 5 emitting the white light by coating green and red fluorescent materials on the blue LED chip 33 at the same time.

Thus, in the light source module according to exemplary embodiments of the present invention, the color reproducibility is better than the light source module indicated by the fourth triangle 105, and has a color reproducibility very close to the color reproducibility of the three-color LED light source module 305.

Accordingly, for exemplary embodiments of the present invention, the light source module 5 and the display apparatus 100 having the stable light efficiency and the enhanced color reproducibility may be presented without the color feedback system 360.

Figure 11:
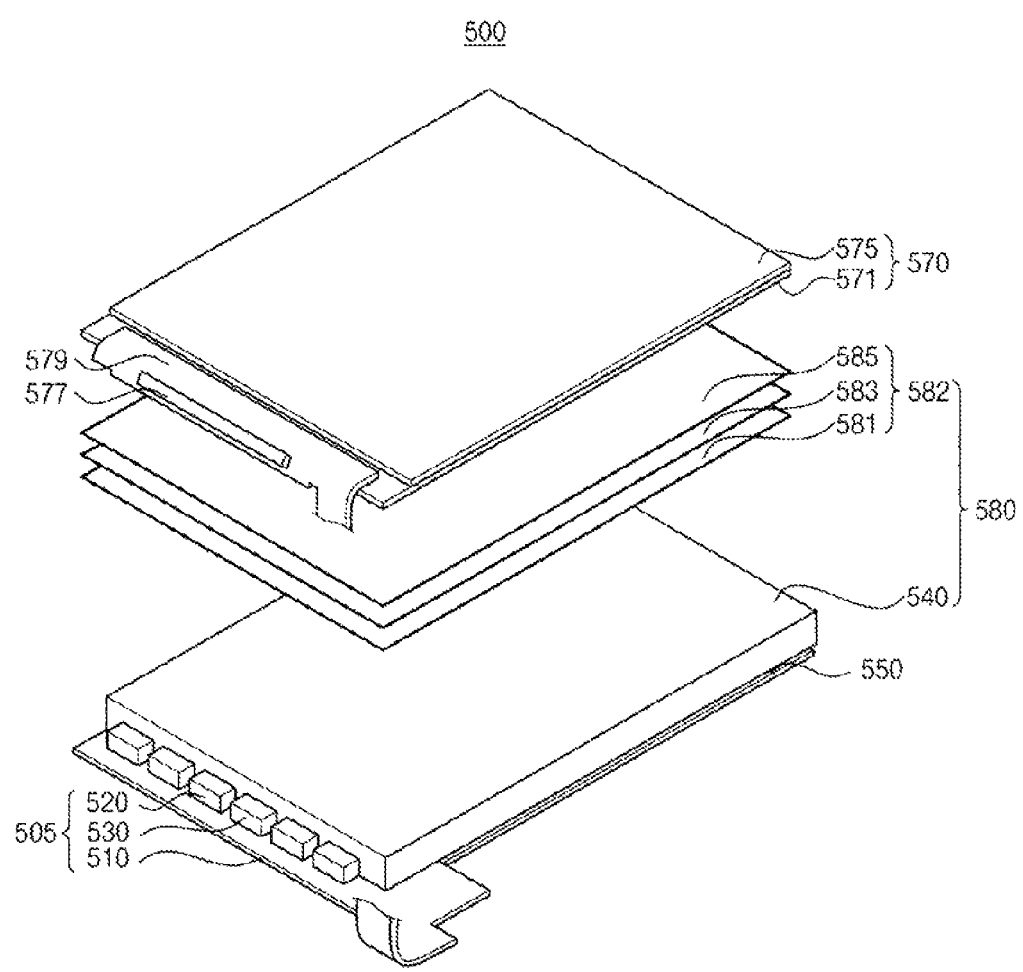
FIG. 11 is an exploded perspective view illustrating a display apparatus according to an exemplary embodiment of the present invention.

FIG. 11 is an exploded perspective view illustrating a display apparatus according to an exemplary embodiment of the present invention.

Referring to FIG. 11, the display apparatus 500 includes a display panel 570, a light guide unit 580 and a light source module 505. The display panel 570 includes an array substrate 571 on which pixels are formed, a counter substrate 575 facing the array substrate 571, and a liquid crystal layer (not shown) disposed between the array substrate 571 and the counter substrate 575. The light guide unit 580 and the light source module 505 according to an exemplary embodiment of the present invention are disposed to form an edge-illumination type display apparatus.

A panel driving part 577 according to an exemplary embodiment is mounted on a panel FPC film 579 as a chip shape, and is connected to the display panel 570.

The light guide unit 580 includes an optical sheet 582 and a light guide plate 540. The light guide plate 540 is disposed on a rear surface of the display panel 570, and the optical sheet 582 is disposed between the light guide plate 540 and the display panel 570. The optical sheet 582 may further include a diffusing sheet 581 and condensing sheets 583 and 585 sequentially formed on the light guide plate 540.

The light source module 505 according to an exemplary embodiment includes a first light source 530, a second light source 520 and a power-transmitting element 510. The display apparatus 500 may further include a light source driving part 550. The first and second light sources 530 and 520 according to an exemplary embodiment are substantially the same as the first and second light sources 30 and 20 as described above with respect to FIGS. 1 to 5. Thus, the same reference numerals may be used to refer to the same or like parts as those described above and any further repetitive explanation concerning the above elements will be omitted.

The power-transmitting element 510 may be a flexible printed circuit board (FPCB). A plurality of the first light sources 530 and a plurality of the second light sources 520 may be mounted on the power-transmitting element 510, and each of the first light sources 530 and each of the second light sources 520 may be disposed in an alternating arrangement. For example, the blue LED chip of the first light source 530 is electrically connected to a circuit line of the power-transmitting element 510, and the first cover portion of the first light source 530 encapsulates the blue LED to form the first light source 530.

The first and second light sources 530 and 520 are disposed close to a side surface of the light guide plate 540. In this case, the power-transmitting element 510 is partially disposed at a side of a lower surface of the light guide plate 540, and alternatively, the power-transmitting element 510 is partially disposed at a side of an upper surface of the light guide plate 540.

The blue LED chip of the first light source 530 emits the blue light. The red fluorescent material dispersed in the first cover portion of the first light source 530 is excited by the partial blue light and emits the red light. The green LED chip of the second light source 520 emits the green light. Thus, the light source module 505 emits the remaining blue light not used for exciting the red fluorescent material, the red light and the green light. The red light, the green light and the blue light are repeatedly and totally reflected inside of the light guide plate 540, to produce white light. The white light is emitted to the upper surface of the light guide plate 540 and is irradiated to the optical sheet 582, when the white light deviates from total reflection conditions.

As mentioned above, the first and second light sources 530 and 520 have the stable light efficiency and the enhanced color reproducibility with respect to the variation of the temperature. Thus, the display quality of the display apparatus 500 may be enhanced.

According to an exemplary embodiment of the present invention, each of the variations of amounts of red, green and blue light is very small even though the variation of a temperature is very large, so that stable light efficiency may be obtained. Thus, an expensive device such as a color feedback system may be omitted and color reproducibility may be enhanced.

The foregoing is illustrative of exemplary embodiments of the present invention and is not to be construed as limiting. Although a few exemplary embodiments of the present invention have been described, those skilled in the art will readily appreciate that many modifications are possible without materially departing from the present invention.

What is claimed is:

1. A light source module for a display device comprising:
a blue light-emitting body emitting blue light;
a red fluorescent material covering the blue light-emitting body, and emitting red light from the red fluorescent material excited by the blue light from the blue light-emitting body; and
a green light-emitting body disposed adjacent to the blue light-emitting body, and emitting green light,
wherein variations for each of the amounts of the red, green and blue light is within about ±10% with respect to a reference amount of light which is an average value of the amounts of the red, green and blue light at 20° C., when the temperature is in a range between about −40° C. and about 100° C.

2. The light source module of claim 1, wherein the red fluorescent material comprises a silicate-based fluorescent material consisting of a Zn2SiO4:Mn2+ fluorescent material, a Mg2SiO4:Mn2+ fluorescent material, a Ba2SiO4:Mn2+ fluorescent material, a Sr2SiO4:Mn2+ fluorescent material, or a Ca2SiO4:Mn2+ fluorescent material.

3. The light source module of claim 2, wherein the blue light-emitting body and the green light-emitting body each comprise a light-emitting diode (LED) chip comprising a GaN-based material.

4. The light source module of claim 2, further comprising a driving part individually applying a driving current to the blue light-emitting body and the green light-emitting body to control color coordinates of the module-emitted light.

5. The light source module of claim 4, further comprising a first light source and a second light source, the first light source comprising the blue light-emitting body and the red fluorescent material, the second light source comprising the green light-emitting body,
wherein the driving part individually applies a predetermined driving current to the blue light-emitting body and the green light-emitting body to reach target color coordinates of the module-emitted light, without using a feedback device sensing the light emitted from the first and second light sources and feeding the light back to control the color coordinates of the module-emitted light.

6. The light source module of claim 5, wherein the driving part individually applies the driving current to the blue light-emitting body and the green light-emitting body to generate white light from the module-emitted light.

7. The light source module of claim 4, further comprising a power-transmitting substrate, a first light source and a second light source, the power-transmitting substrate electrically connected to the driving part, the first light source comprising the blue light-emitting body and the red fluorescent material, the second light source comprising the green light-emitting body,
wherein a plurality of basic clusters is formed on the power-transmitting substrate, and each of the basic clusters comprises the first and second light sources.

8. The light source module of claim 7, wherein the distance between the basic clusters adjacent to each other is different from the distance between the first and second light sources.

9. The light source module of claim 7, wherein the first light source further comprises a first cover portion enclosing the blue light-emitting body, the second light source further comprises a second cover portion enclosing the green light-emitting body, and the red fluorescent material is dispersed within the first cover portion.

10. A display apparatus comprising:
a display panel displaying an image;
a light guide unit disposed on a rear surface of the display panel; and
a light source module disposed on at least one surface of the light guide unit, the light source module comprising:
a blue light-emitting body emitting blue light,
a red fluorescent material covering the blue light-emitting body, and emitting red light from the red fluorescent material excited by the blue light from the blue light-emitting body, and
a green light-emitting body disposed adjacent to the blue light-emitting body, and emitting green light,
wherein variations for each of the amounts of the red, green and blue light is within about ±10% with respect to a reference amount of light which is an average value of the amounts of the red, green and blue light at 20° C., when the temperature is in a range between about −40° C. and about 100° C.

11. The display apparatus of claim 10, wherein the blue light-emitting body and the green light-emitting body each comprise an LED chip comprising substantially the same material, such that an amount of light emitted from the blue light-emitting body and an amount of the light emitted from the green light-emitting body each vary with changes in temperature by substantially the same amount.

12. The display apparatus of claim 11, wherein the red fluorescent material comprises a silicate-based fluorescent material consisting of a Zn2SiO4:Mn2+ fluorescent material, a Mg2SiO4:Mn2+ fluorescent material, a Ba2SiO4:Mn2+ fluorescent material, a Sr2SiO4:Mn2+ fluorescent material, or a Ca2SiO4:Mn2+ fluorescent material.

13. The display apparatus of claim 12, further comprising a light source driving part individually applying a driving current to the blue light-emitting body and the green light-emitting body to control color coordinates of the module-emitted light.

14. The display apparatus of claim 13, further comprising a panel driving part transmitting a panel driving signal displaying the image to the display panel, and transmitting a light source driving signal to the light source driving part, the light source driving signal being linked with the panel driving signal and individually designating a driving current to the blue light-emitting body and the green light-emitting body.

15. The display apparatus of claim 14, wherein the light source module further comprises a first light source and a second light source, the first light source comprises the blue light-emitting body and the red fluorescent material, the second light source comprises the green light-emitting body, and the panel driving part individually applies a predetermined driving current to the blue light-emitting body and the green light-emitting body to reach target color coordinates of the module-emitted light, without using a feedback device sensing the light emitted from the first and second light sources and feeding the light back to control the color coordinates of the light source module.

16. The display apparatus of claim 15, wherein the panel driving part dims a color and brightness of the module-emitted light of the light source module in accordance with a color and a brightness of the image.

17. The display apparatus of claim 15, wherein color reproducibility of the module-emitted light reaches more than 95% of ideal color coordinates.

18. The display apparatus of claim 13, wherein the light source module further comprises a first light source and a second light source, the first light source comprises the blue light-emitting body and the red fluorescent material, the second light source comprises the green light-emitting body, and the light source module further comprises a power-transmitting substrate electrically connected to the light source driving part, and a plurality of basic clusters is formed on the power-transmitting substrate, and each of the basic clusters comprises the first and second light sources.

* * * * *

UNITED STATES PATENT AND TRADEMARK OFFICE
CERTIFICATE OF CORRECTION

PATENT NO. : 8,604,686 B2  
APPLICATION NO. : 13/633587  
DATED : December 10, 2013  
INVENTOR(S) : Hyun-Jin Kim Page 1 of 1

It is certified that error appears in the above-identified patent and that said Letters Patent is hereby corrected as shown below:

ON THE TITLE PAGE, ITEM (30)

THE FOREIGN APPLICATION PRIORITY DATE AS LISTED IN THE LETTERS PATENT READS:

NOVEMBER 9, 2008

THE FOREIGN APPLICATION PRIORITY DATE IN LETTERS PATENT SHOULD READ:

SEPTEMBER 11, 2008

Signed and Sealed this  
Fourth Day of March, 2014

Michelle K. Lee  
*Deputy Director of the United States Patent and Trademark Office*